(12) United States Patent
Gareau et al.

(10) Patent No.: US 11,658,737 B2
(45) Date of Patent: May 23, 2023

(54) MESSAGING CHANNEL IN A COHERENT OPTICAL DSP FRAME

(71) Applicant: Ciena Corporation, Hanover, MD (US)

(72) Inventors: Sebastien Gareau, Ottawa (CA); Timothy James Creasy, Manotick (CA)

(73) Assignee: Ciena Corporation, Hanover, MD (US)

( * ) Notice: Subject to any disclaimer, the term of this patent is extended or adjusted under 35 U.S.C. 154(b) by 97 days.

(21) Appl. No.: 17/383,897

(22) Filed: Jul. 23, 2021

(65) Prior Publication Data

US 2023/0031796 A1  Feb. 2, 2023

(51) Int. Cl.
| | |
|---|---|
| *H04B 10/61* | (2013.01) |
| *H04B 10/07* | (2013.01) |
| *H04J 3/14* | (2006.01) |
| *H04L 49/9057* | (2022.01) |
| *H04L 25/49* | (2006.01) |
| *H04B 10/40* | (2013.01) |

(52) U.S. Cl.
CPC ............. *H04B 10/07* (2013.01); *H04B 10/40* (2013.01); *H04B 10/616* (2013.01); *H04J 3/14* (2013.01); *H04L 25/4908* (2013.01); *H04L 49/9057* (2013.01); *H04J 2203/006* (2013.01)

(58) Field of Classification Search
CPC ................................................ H04B 10/61–65
See application file for complete search history.

(56) References Cited

U.S. PATENT DOCUMENTS

| | | | |
|---|---|---|---|
| 6,986,097 B1 | 1/2006 | Ireland et al. | |
| 7,003,708 B1 | 2/2006 | Ireland et al. | |
| 7,039,854 B1 | 5/2006 | Ireland et al. | |
| 7,058,876 B1 | 6/2006 | Ireland et al. | |
| 7,073,117 B1 | 7/2006 | Ireland et al. | |
| 7,096,408 B1 | 8/2006 | Ireland et al. | |
| 8,306,420 B2 | 11/2012 | Conklin et al. | |
| 8,356,233 B2 | 1/2013 | Nichols et al. | |
| 8,458,560 B2 | 6/2013 | Nichols | |
| 8,718,471 B2 | 5/2014 | Prakash et al. | |
| 8,732,358 B2 | 5/2014 | Nichols et al. | |

(Continued)

FOREIGN PATENT DOCUMENTS

EP     2 983 314 A1     2/2016

OTHER PUBLICATIONS

ITU-T G.709.3 Amendment 1, "Flexible OTN long-reach interfaces," Jun. 2018, pp. 1-23. (Year: 2018).*

(Continued)

*Primary Examiner* — Nathan M Cors
(74) *Attorney, Agent, or Firm* — Baratta Law PLLC; Lawrence A. Baratta, Jr.

(57) ABSTRACT

Systems and methods include receiving a plurality of symbols that are part of a defined Digital Signal Processing (DSP) frame for coherent optical communication, wherein the DSP frame structure has a messaging channel incorporated therein that includes a subset of the plurality of symbols; capturing multiple samples of the messaging channel; and determining a message in the messaging channel based on analysis of the multiple samples. The method can further include transmitting, in the messaging channel, a reply to the message with the reply being repeated multiple times. The analysis is performed prior to Forward Error Correction (FEC) decoding on the data path.

20 Claims, 6 Drawing Sheets

(56) References Cited

U.S. PATENT DOCUMENTS

| | | |
|---|---|---|
| 8,830,993 B1 | 9/2014 | Dublin et al. |
| 8,867,913 B2 | 10/2014 | Gareau et al. |
| 9,264,139 B2 | 2/2016 | Young et al. |
| 9,825,883 B2 | 11/2017 | Nichols et al. |
| 9,980,021 B2 | 5/2018 | Oltman et al. |
| 10,063,336 B1 | 8/2018 | Moynihan et al. |
| 10,135,760 B2 | 11/2018 | Gareau |
| 10,193,688 B2 | 1/2019 | Gareau et al. |
| 10,218,823 B2 | 2/2019 | Gareau |
| 10,225,037 B2 | 3/2019 | Gareau |
| 10,256,909 B2 | 4/2019 | Gareau et al. |
| 10,313,103 B1 | 6/2019 | Perras et al. |
| 10,382,167 B2 | 8/2019 | Gareau et al. |
| 10,396,972 B1 | 8/2019 | Gareau et al. |
| 10,397,088 B2 | 8/2019 | Gareau |
| 10,425,177 B2 | 9/2019 | Gareau et al. |
| 10,498,476 B2 | 12/2019 | Gareau et al. |
| 10,567,352 B2 | 2/2020 | Gareau et al. |
| 10,594,395 B2 | 3/2020 | Abdullah et al. |
| 10,673,782 B2 | 6/2020 | Gareau et al. |
| 10,750,260 B1 | 8/2020 | Gareau |
| 10,826,600 B2 | 11/2020 | Ibach et al. |
| 10,868,662 B2 | 12/2020 | Gareau et al. |
| 11,387,929 B1* | 7/2022 | Zhang ................... H04B 10/614 |
| 2007/0071456 A1* | 3/2007 | Chen ....................... H04B 10/64 |
| | | 398/204 |
| 2009/0060511 A1* | 3/2009 | Toyoshima ............. H04L 7/033 |
| | | 398/74 |
| 2020/0177361 A1 | 6/2020 | Gareau et al. |
| 2020/0358722 A1 | 11/2020 | Gareau et al. |
| 2020/0396050 A1 | 12/2020 | Perras et al. |

OTHER PUBLICATIONS

Mike A. Sluyski, "Open ROADM MSA 3.01 W-Port Digital Specification (200G-400G)", Open ROADM—Draft document, Jun. 25, 2019, pp. 1-56.

Atul Srivastava et al,, "Open ZR+ MSA", Technical Specification, Version 1.0, Sep. 4, 2020, pp. 1-74.

Telecommunication Standardization Sector of ITU, ITU-T G.709. 3/Y.1331.3, "Flexible OTN long-reach interfaces", Jun. 2018, pp. 1-34.

Mike A, Sluyski et al., OIF, "Implementation Agreement 400ZR," OIF-400ZR-01.0, Mar. 10, 2020, pp. 1-100.

\* cited by examiner

MESSAGING CHANNEL IN A COHERENT OPTICAL DSP FRAME

FIELD OF THE DISCLOSURE

The present disclosure generally relates to optical networking. More particularly, the present disclosure relates to systems and methods for a messaging channel within a coherent optical Digital Signal Processing (DSP) frame.

BACKGROUND OF THE DISCLOSURE

Coherent optical modem deployments are exploding in optical networks, used for a variety of Optical Transport Network (OTN), Flexible Optical (FlexO), and Ethernet applications. These enable 100 Gb/s, 200 Gb/s, 400 Gb/s, 600 Gb/s, 800 Gb/s and beyond to meet the ever-growing network demand. Until recently, deployments focused on proprietary vendor implementations. Work is underway to define specifications, standards, and Implementation Agreements to support interoperability and multi-vendor implementations. Each specification defines a coherent optical DSP frame, such interfaces are now standardized in G.709.3/Y.1331.3 (06/18), and G.709.3/Y.1331.3 Amendment 1 (11/18), "Flexible OTN long-reach interfaces," and in OIF Implementation Agreement 400ZR, OIF-400ZR-01.0, Mar. 10, 2020; the contents of each are incorporated by reference herein. There is another coherent optical Ethernet interface referred to as OpenZR+ (available at www.openzrplus.org) and described in the OpenZR+ Specifications, v. 1.0, 4 Sep. 2020; the contents are incorporated by reference. Also, IEEE is now also looking at using coherent technology for 400GBASE-ZR and future 800G interfaces. These various DSP frame standards are collectively referred to as DSP frames, and each generally includes a similar structure to one another.

A DSP frame is a definition of symbols, i.e., a symbol structure. Symbols can be points on a Quadrature Amplitude Modulation (QAM) signal constellation, and each symbol can represent more than one bit of information, e.g., in 16-QAM, each symbol represents four bits. The DSP frame is used for coherent modulation/demodulation, absolute phase, signal recovery using training, etc. For example, the 400ZR definition includes a DSP super-frame is defined as a set of 181888 symbols in each of the X/Y polarization, a DSP sub-frame consists of 3712 symbols, and a DSP super-frame thus consists of 49 DSP sub-frames There is currently no specification for an in-band messaging channel using overhead in the DSP frame structure. Existing protocol layer communication channels are not accessible before having a DSP layer (and most of the Physical Coding Sublayer (PCS) sublayer) up and running, i.e., a stable bi-directional physical link. These lead to the proverbial "chicken-and-egg" issue where it could take milliseconds or even seconds to get a stable bi-directional physical link. This is not ideal for tweaks with DSP settings and for sharing other data before a stable link, e.g., unique identifiers.

BRIEF SUMMARY OF THE DISCLOSURE

The present disclosure relates to systems and methods for a messaging channel in a coherent optical Digital Signal Processing (DSP) frame. The messaging channel is a communications channel, signaling channel, etc. Traditionally, communications channels are at the protocol layer, post Forward Error Correction (FEC) after there is a stable bi-directional physical link. The present disclosure defines the messaging channel (i.e., communications channel) pre-FEC at a DSP symbol level, withing a Physical Media Attachment (PMA) sublayer. The messaging channel includes various approaches for robustness across an otherwise unprotected (FEC) set of bits. The degree of robustness can be traded off against computational complexity and detection latency, according to system requirements—in a way that is not possible with existing protocol overhead channels. The messaging channel can be used for a variety of functions including advertising vendor identification, module information, assisting in DSP acquisition, polarization X/YI/Q tributary mappings, clock recovery settings, bandwidth, and the like. This could be used to speed up signal acquisition.

In an embodiment, coherent optical modem includes circuitry configured to receive a plurality of symbols that are part of a defined Digital Signal Processing (DSP) frame structure for coherent optical communication, wherein the DSP frame has a messaging channel included therein that includes a subset of the plurality of symbols, capture samples of the messaging channel, and determine a message in the messaging channel based on analysis of the samples. The circuitry can be further configured to transmit, in the messaging channel, a reply to the message in a robust manner. The robust manner can include any of the reply is repeated on any of different polarizations, different DSP frames, and different symbols in a same DSP frame, and use of symbols in the messaging channel for any of parity, Cyclic Redundancy Check (CRC), and Forward Error Correction (FEC). The determination of the message is performed prior to Forward Error Correction (FEC) decoding on the data path. The messaging channel is available prior to the coherent optical modem having a stable bi-directional connection with a corresponding coherent optical modem.

The DSP frame can be compliant to G.709.3 Amendment 1 or OIF Implementation Agreement 400ZR or OpenZR+ MSA. The message can include any of a message payload, a counter, a version number, and an identifier. The message can include hardware details. The message can include I/Q tributary mapping information. The plurality of symbols can include any of N-Quadrature Amplitude Modulation (QAM) symbols, where N is an integer, and PCS-QAM with probabilistic constellation shaping, where the PCS has a fractional value, and hybrid N-QAM.

In another embodiment, a coherent optical modem includes circuitry configured to receive a message to send to a corresponding coherent optical modem, insert the message into a subset of a plurality of symbols that are part of a defined Digital Signal Processing (DSP) frame structure for coherent optical communication, wherein the subset of the plurality of symbols is a messaging channel included in the DSP frame structure, and cause transmission of the plurality of symbols to the corresponding coherent optical modem with the message included in the messaging channel.

The circuitry can be further configured to receive a plurality of symbols from the corresponding coherent optical modem, capture samples of the messaging channel, and determine a message in the messaging channel based on analysis of the samples. The messaging channel can include transmission in a robust manner utilizing any of the message is repeated on any of different polarizations, different DSP frames, and different symbols in a same DSP frame, and use of symbols in the messaging channel for any of parity, Cyclic Redundancy Check (CRC), and Forward Error Correction (FEC). The messaging channel is available prior to the coherent optical modem having a stable bi-directional connection with a corresponding coherent optical modem. The DSP frame can be compliant to G.709.3 Amendment 1 or OIF Implementation Agreement 400ZR or OpenZR+ MSA.

In a further embodiment, a method includes receiving a plurality of symbols that are part of a defined Digital Signal Processing (DSP) frame structure for coherent optical communication, wherein the DSP frame has a messaging channel included therein that includes a subset of the plurality of symbols; capturing samples of the messaging channel; and determining a message in the messaging channel based on analysis of the samples.

The method can include transmitting, in the messaging channel, a reply to the message in a robust manner. The robust manner can include any of the reply is repeated on any of different polarizations, different DSP frames, and different symbols in a same DSP frame, and use of symbols in the messaging channel for any of parity, Cyclic Redundancy Check (CRC), and Forward Error Correction (FEC). The determining includes extraction and interpretation performed prior to Forward Error Correction (FEC) decoding on the data path. The messaging channel is available prior to a coherent optical modem having a stable bi-directional connection with a corresponding coherent optical modem.

The DSP frame can be compliant to G.709.3 Amendment 1 or OIF Implementation Agreement 400ZR. The message can include any of a message payload, a counter, a version, and an Organizationally Unique Identifier. The message can include hardware details. The message can include I/Q tributary mapping information. The plurality of symbols can include any of N-Quadrature Amplitude Modulation (QAM) symbols, where N is an integer, PCS-QAM with probabilistic constellation shaping, where the PCS has a fractional value, and hybrid N-QAM.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is FIG. 15.1 from G.709.3/Y.1331.3 Amendment 1 (11/18).

DETAILED DESCRIPTION OF THE DISCLOSURE

Again, the present disclosure relates to systems and methods for a messaging channel in a coherent optical Digital Signal Processing (DSP) frame. The messaging channel is a communications channel, signaling channel, etc. Traditionally, such communications channels take place at the protocol layer, post Forward Error Correction (FEC) after there is a stable bi-directional connection. The present disclosure defines the messaging channel (i.e., communications channel) pre-FEC at a DSP symbol level, within a Physical Media Attachment (PMA) sublayer. The messaging channel includes various approaches for robustness across an otherwise unprotected (FEC) set of bits. The degree of robustness can be traded off against computational complexity and detection latency, according to system requirements—in a way that is not possible with existing PCS overhead channels. The messaging channel can be used for a variety of functions including advertising module information, assisting in DSP signal acquisition, polarization X/Y/I/Q tributary mappings, clock recovery settings, bandwidth, and the like. This could be used to speed up frame acquisition.

Network

Figure 1:
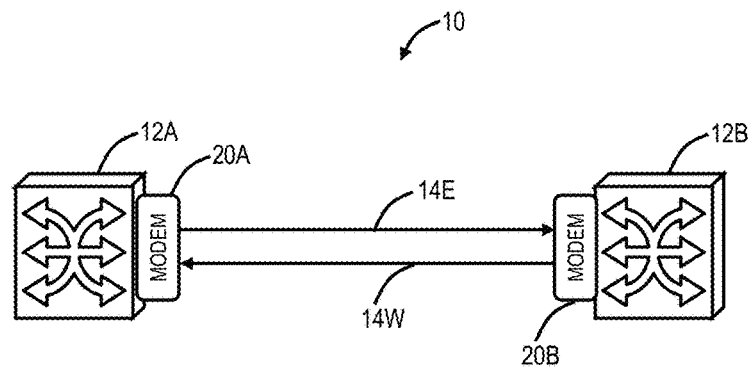
FIG. 1 is a network diagram of an optical network 10 between two nodes.

FIG. 1 is a network diagram of an optical network 10 between two nodes 12A, 12B. The nodes 12A, 12B are interconnected by links 14E, 14W providing bidirectional communication. The links 14E, 14W are optical fibers and the nodes 12A, 12B can be network elements, and the nodes 12A, 12B can each include a coherent optical modem 20A, 20B. The nodes 12A, 12B can be switches, routers, Wavelength Division Multiplexing (WDM) terminals, Reconfigurable Optical Add/Drop Multiplexers (ROADMs), routers, switches, and the like. That is, practically any type of network element or device can use coherent optical modems 20A, 20B. The coherent optical modems 20A, 20B are connected to one another via the links 14E, 14W and can include optical transceivers, transponders, transmitters/receivers, etc. The coherent optical modems 20A, 20B can be pluggable modules such as defined by various Multisource Agreements (MSAs), e.g., QSFP variants, CFP variants, etc. The coherent optical modems 20A, 20B can also be 400ZR, G.709.3, and the like. The coherent optical modems 20A, 20B can support OTN (FlexO), Ethernet, and the like.

Note, the optical network 10 is presented for illustration purposes to describe the messaging channel methods. Practical embodiments contemplate additional nodes in various interconnection architectures. Also, note, the terms nodes, network elements, network devices can be used interchangeably herein. The present disclosure contemplates use of the coherent optical modems 20A, 20B with a DSP frame in any device.

Coherent Modem Functionality

The modems 20A, 20B are coherent optical modems with Digital Signal Processing (DSP) therein. The modems 20A, 20B can support programmable modulation, or constellations with both varying phase and/or amplitude. The modems 20A, 20B can support multiple coherent modulation formats such as, for example, i) Dual-Polarization (DP) Binary Phase-Shift Keying (BPSK), ii) DP Quadrature Phase-Shift Keying (QPSK), iii) DP 16-Quadrature Amplitude Modulation (QAM), iv) DP 16QAM, iv) DP 64QAM, and the like. With associated DSP blocks in the modem 20A, 20B hardware, moving from modulation formats can be software-programmable. Also, the modems 20A, 20B can support dual-polarization, such as Polarization Multiplexing (X/Y or Horizontal/Vertical). Additionally, the modems 20A, 20B can support various aspects of nonlinear effect mitigation and dispersion compensation (both for chromatic and polarization mode) in the electrical domain, thus eliminating external dispersion compensation devices, filters, etc. Modems can also adapt the FEC coding that is used, as another method to tradeoff service rate vs. noise tolerance.

Figure 2:
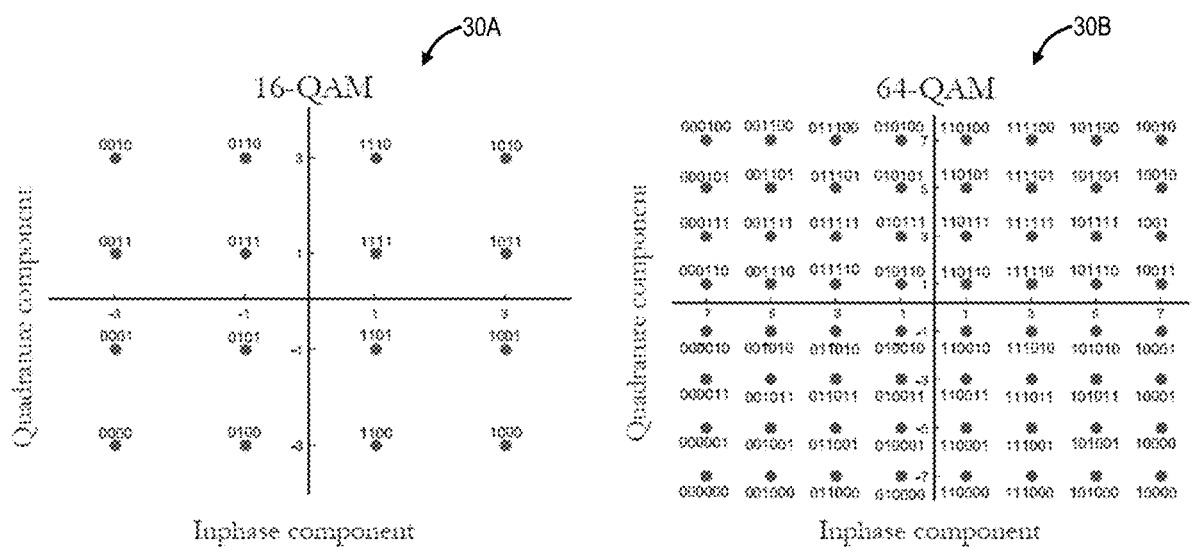
FIG. 2 is a graph illustrating DSP symbols for 16-QAM and 64-QAM (Quadrature Amplitude Modulation (QAM)).

FIG. 2 is a graph illustrating DSP symbols 30A, 30B for examples of 16-QAM and 64-QAM. Note, the DSP frame is defined in terms of symbols. Note, the graph includes an in-phase (I) component and quadrature (Q) component. Also, with polarization multiplexing, there is a graph for each polarization, i.e., X/Y each having I:Q components. In 16-QAM, there are 16 possible symbols each representing 4-bits. In 64-QAM, there are 64 possible symbols each representing 6-bits. Of course, 16-QAM and 64-QAM are merely two examples and there can be others, e.g., 4-QAM, 8-QAM, 128-QAM, etc.

DSP Frame

Figure 3:
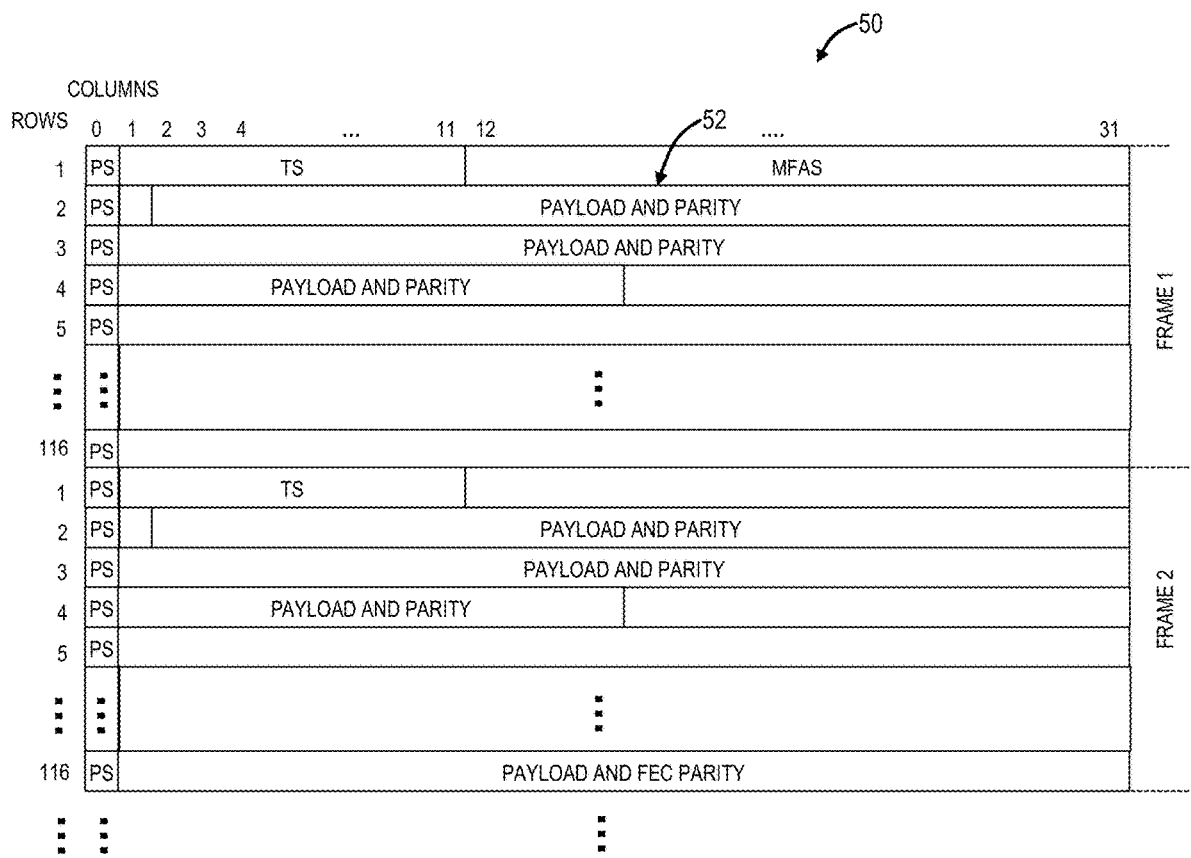
FIG. 3 is a block diagram of a DSP frame, namely
Figure 4:
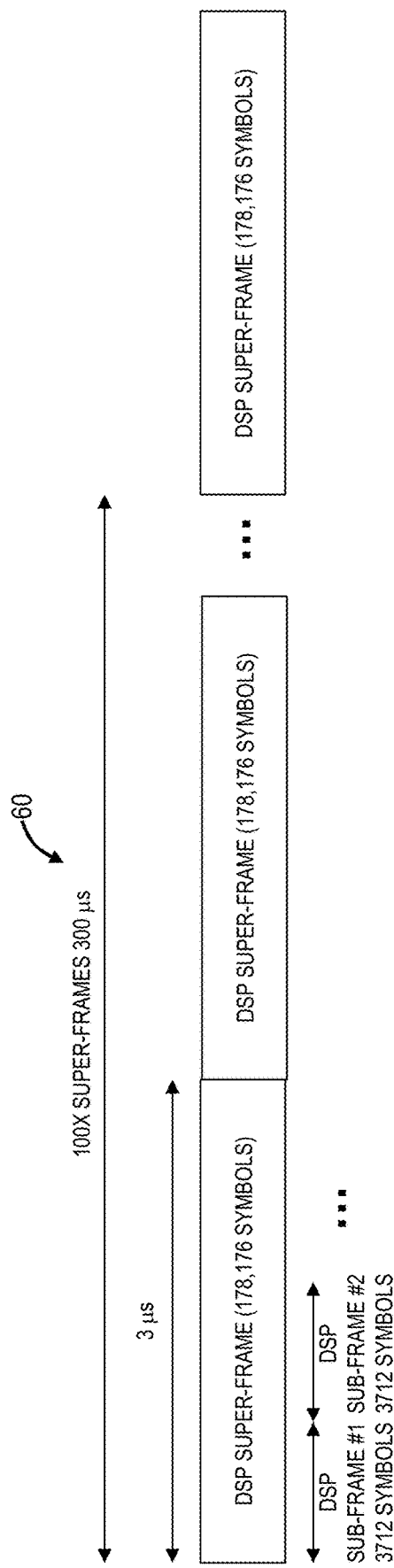
FIG. 4 is a block diagram of DSP super-frames, namely from FIG. 25 of the OpenROADM MSA 3.01.

FIG. 3 is a block diagram of a DSP frame 50, and FIG. 4 is a block diagram of DSP super-frames 60. As described herein, a DSP frame is a structure of symbols that is used to organize the modulated/demodulated data in a transmitter and receiver, i.e., a coherent optical modem 20. The present disclosure utilizes the term "DSP frame" because it is the data sent to the transmitter and received from the receiver, and the data includes symbols (each symbol represents bits). The DSP frame has been standardized, for example, in FIG. 15.1 from G.709.3/Y.1331.3 Amendment 1 (11/18) as well as in FIG. 8 of the OIF 400ZR IA 1.0. Of course, other embodiments of a DSP frame are also contemplated including proprietary implementations and future standardized versions, all of which are contemplated herewith. Generally, the DSP frame includes symbols for training and pilot, padding/reserved sections, data payload, etc. A key aspect of the DSP frame is it is processed pre-FEC so there is no conventional defined messaging channel therein.

FIG. 3 is FIG. 15.1 from G.709.3/Y.1331.3 Amendment 1 (11/18) and includes various payload and parity 52 fields, which can include padding symbols. FIG. 4 utilizes a DSP super-frame 60 from FIG. 25 of the OpenROADM MSA 3.01 and includes 74 additional symbols are reserved for future use/innovation.

Figure 5:
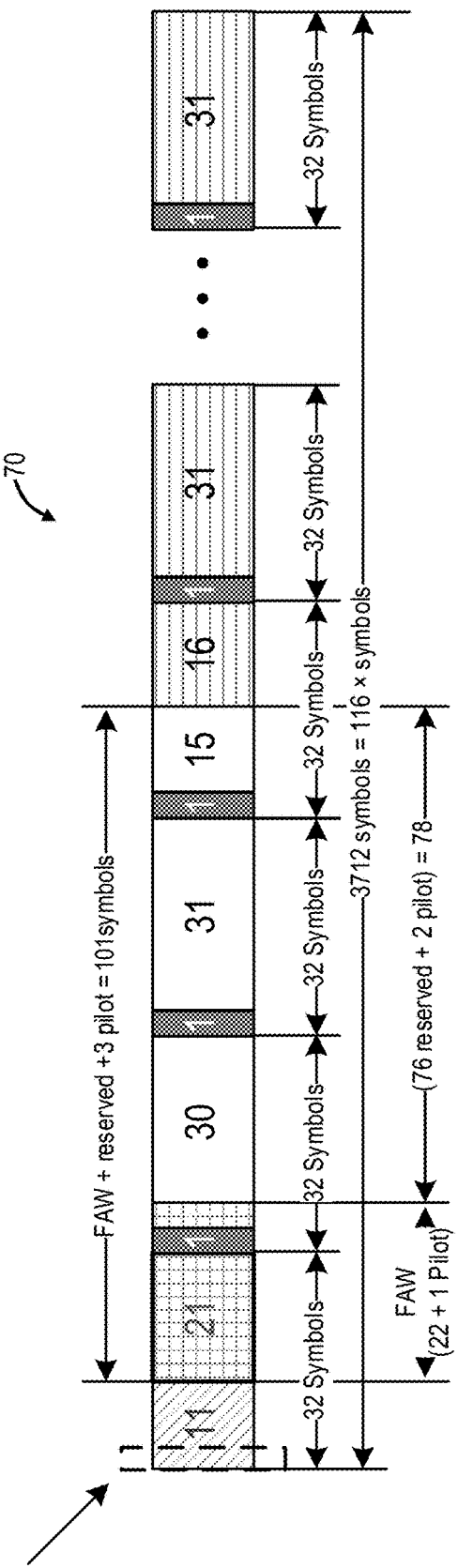
FIG. 5 is a block diagram of a DSP frame, namely FIG. 34 of OIF-400ZR-01.0 Implementation Agreement.

FIG. 5 is a block diagram of a DSP frame 70, namely FIG. 34 of OIF-400ZR-01.0 Implementation Agreement. The DSP frame 70 includes 11 symbols for a training sequence, 22 symbols as a super-frame alignment word, 76 symbols reserved for future use (reserved symbols 72), pilot symbols, and information, FEC parity symbols. With regard to the reserved symbols, the OIF-400ZR-1.0 Implementation Agreement (section 12.1) states solely: 76 symbols are reserved to be used for future proofing and for innovation. These symbols should be randomized to avoid strong tones. These symbols should be selected from 16-QAM modulation.

DSP Frame Messaging Channel

The present disclosure describes a new signaling and messaging mechanism directly between the digital modulator and demodulator blocks in a communications system, i.e., the coherent modems 20. It can be used to communicate low-bandwidth control information (as distinct from the much higher volume payload data) from one end of a link to the other. It does so by incorporating this side information directly into the DSP frame structure—at the physical symbol level—the baseline of which has been defined in various (coherent optical) communications systems.

The present disclosure contemplates any of the aforementioned DSP frames 50, 60, 70, and future ones as well. In an embodiment, the present disclosure utilizes the so-called reserved symbols or padding symbols for the messaging channel. Of course, the DSP frame specifications can also specify specific symbols for the messaging channel as well. That is, the present disclosure is not limited only to undefined symbols.

The padding symbols and the reserved symbols 72 exist due to a slight mismatch between the size of the data payload and the dimensions of the physical frame; effectively they are padding to make up the relatively small difference. As currently standardized in 400ZR, the Reserved symbols represent a "wasted" (un-utilized) overhead of:

(76 symbols per polarization)/(3712 symbols/subframe)/(49 sub-frames per superframe)=~0.04% of the available communication bandwidth A similar calculation can be made for OpenROADM, OpenZR+, etc. which have slightly different ratios due to the different FEC schemes and frame dimensions employed.

The messaging channel is defined in terms of symbols in the DSP frames 50, 60, 70 by carefully selecting the symbol values and making them appear random so that all desirable properties are preserved. Examples for making them appear random include line encoding (e.g., 8b/10b), scrambling, etc. By careful design, it is possible to ensure that no degradation in performance is introduced during inter-operation with modems 20 that have not implemented the messaging channel (e.g., those from other vendors, until standardized). That is, one coherent modem 20A can implement the messaging channel while the other coherent modem 20B does not, and still inter-operate normally; of course without the messaging channel.

Also, it is not necessary to use all reserved symbols 72 or padding symbols for the messaging channel. In an embodiment, it is possible to use the last reserved symbols 70, starting at the right side in FIG. 5. This is done to reduce the likelihood of conflict with other future standard functions (e.g., multiframe (MF), Precision Timing Protocol (PTP) over DSP, . . . ) that might use some of these symbols and which are likely to be introduced starting from the left.

The present disclosure also lends itself to be adapted into any new DSP frame structure, such as the 1.5% overhead one discussed in 800ZR. Thus, the messaging channel can be applied to 800ZR/FlexO-x/xe interfaces and beyond.

In general, each dual-polarization QAM symbol can convey different amounts of information according to the "modulation order," e.g., 4 bits (QPSK), 6 bits (8-QAM) or 8 bits (16-QAM). Even more generally, when probabilistic constellation shaping or hybrid QAM schemes are used (this is not true for 400ZR), the number of bits carried per symbol can also be a fractional value (e.g., 5.3 bits per symbol).

DSP Frame Messaging Channel Applications

This messaging channel can be used by DSP engines to optimize the physical link before the FEC has started decoding and the protocol layer is up and running. Here are a few non-limiting and non-exhaustive examples of what such a signaling and messaging scheme can enable:

1) Advertise on the transmitter that this is a specific manufacturer (or other unique manufacturer identifier). This can be detected by receivers to understand the interoperability. For example, bookended receivers (i.e., coherent modems 20 from the same vendor) could enable other optimizations (including those that go beyond or technically violate the standard) for bookended applications.

2) Could be used to signal variants within the same vendor's implementations, such as different lasers, different hardware versions (e.g., Tx drivers) that have different capabilities.

3) Could be used to detect permutations of Tx I/Q tributary mappings (Ref. 400ZR IA 1.0, section 12.4 "Channel mapping").

4) Can be used in a bidirectional link for one end to communicate the X/Y: I/Q tributary mappings detected by a receiver, and can be used in an algorithm to enable swapping on a transmitter (in absence of swapping capability on a receiver).

5) DSP transmit/receive (T/R) loop optimizations for settings like transmitter pre-compensation and spectral shaping.

6) Master/slave timing/clocking loop modes (to reduce clock jitter experienced on the received symbols).

7) Topology and connection monitoring.

Example DSP Frame Messaging Channel

In an embodiment, some symbols of the DSP padding symbols or reserved symbols 72 are used to define a messaging channel as follows. Different formats are also contemplated.

Use 80-bit messaging format, which would translate to 20× QPSK symbols or 10× 16QAM symbols. These bits are raw and must be protected against bit errors and must be DC balanced. It is proposed that the 8b10b coding scheme be used to translate an 8-byte message (shown below) to these 80 Reserved bits.

The message format would be as shown below.

| MSG - 32-bits | CTR - 4-bits | VER - 4-bits | OUI - 24-bits |
|---|---|---|---|

One could choose to only use the OUI (Organizationally Unique Identifier) portion of the message to advertise manufacturer only. As well, one could choose to grow the messaging field, and this can be controlled by the version (VER) field.

OUI—Ethernet Organizationally Unique Identifier for the modem manufacturer, as per standards-oui.ieee.org/oui/oui.txt. It is easier to use existing forums for such unique identifiers than to define and manage a new set.

VER—Version field to identify protocol used in the messaging field. For example, 0x0 reserved to signal it is advertising for a bookended configuration only, message blank, and 0xF reserved to signal backwards defect (unable to decode the message being received from the far end).

CTR—Counter used for slow-protocol handshaking, increments every time a new message is posted.

MSG—4-byte message.

Again, this is just an example format and any type of format is contemplated herewith.

Receiver Process

A receiver process could be as follows:

Firmware captures multiple frame samples of the final symbols in the Reserved field that correspond to 80 bits. These frame samples are not necessarily consecutive, i.e., they could be more than one frame apart.

Validate messages with voting across multiple samples, then 8b10b decoding. This accounts for the pre-FEC operation. The voting includes taking multiple samples, such as from different polarizations, different DSP frames, different symbols within the same DSP frame, etc. Other schemes for validating messages are also contemplated such as using parity, Cyclic Redundancy Check (CRC), FEC such as low complexity schemes, and the like.

If no Coding violation for 8b10b, decode the OUI to identify manufacturer

If VER=0, the Tx only broadcasts.

If VER=0xF, there is a backwards failure, no handshaking possible.

Else decode message based on VER.

Check for new CTR increment (new message).

When new message received and decoded, increment CTR with new Tx message. Add a timeout (e.g., 1s) to send a new message and increment CTR.

The scheme employs a combination of tricks in the pre-processing and post-processing to enable robustness across an otherwise unprotected (FEC) set of bits. Again, the degree of robustness can be traded off against computational complexity and detection latency, according to system requirements—in a way that is not possible with existing PCS overhead channels.

Circuit and Process

Figure 6:
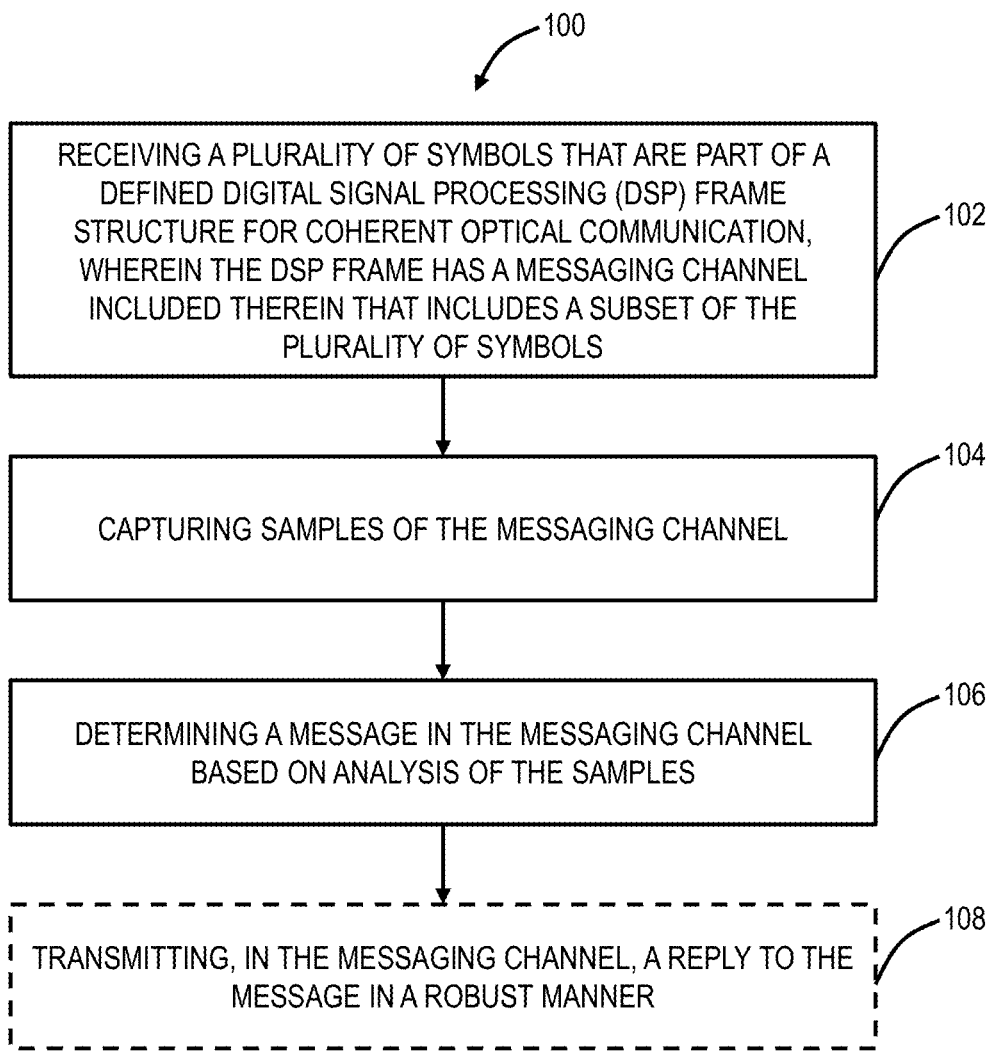
FIG. 6 is a flowchart of a process for implementing a messaging channel within a DSP frame, from a perspective of a receiving coherent optical modem.

FIG. 6 is a flowchart of a process 100 for implementing a messaging channel in a DSP frame. The process 100 can be implemented in a Digital Signal Processor (DSP), Application Specific Integrated Circuit (ASIC), etc. The process 100 can be implemented in one of the coherent modems 20A, 20B (or both).

The process 100 includes receiving a plurality of symbols that are part of a defined Digital Signal Processing (DSP) frame structure for coherent optical communication, wherein the DSP frame structure has a messaging channel included therein that includes a subset of the plurality of symbols (step 102); capturing multiple samples of the messaging channel (step 104); and determining a message in the messaging channel based on analysis of the multiple samples (step 106). The process 100 can also include transmitting, in the messaging channel, a reply to the message in a robust manner (step 108). The robust manner includes any of the reply is repeated on any of different polarizations, different DSP frames, and different symbols in a same DSP frame, and use of symbols in the messaging channel for any of parity, Cyclic Redundancy Check (CRC), and Forward Error Correction (FEC).

The analysis can be performed prior to Forward Error Correction (FEC) decoding on the data path. The messaging channel can be available prior to a coherent optical modem having a stable bi-directional connection with a corresponding coherent optical modem. The DSP frame can be compliant to G.709.3 Amendment 1 or OIF Implementation Agreement 400ZR. The message can include any of a message payload, a counter, a version, and an Organizationally Unique Identifier. The message can include hardware details, tributary mapping information, and the like. The plurality of symbols can include any of N-Quadrature Amplitude Modulation (QAM) symbols, where N is an integer, and PCS-QAM with probabilistic constellation shaping, where the PCS has a fractional value.

Figure 7:
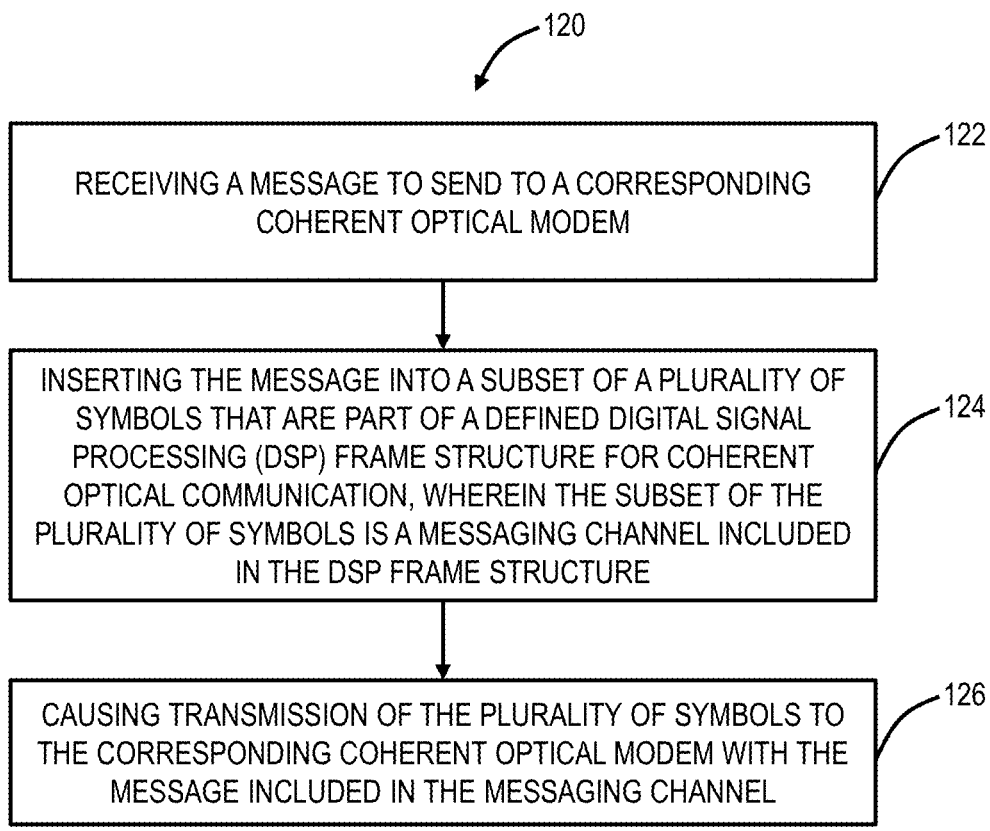
FIG. 7 is flowchart of another process for implementing a messaging channel in a DSP frame, from a perspective of a transmitting coherent optical modem.

FIG. 7 is flowchart of another process 120 for implementing a messaging channel in a DSP frame. For example, the process 100 focuses on the perspective of a receiving coherent optical modem whereas the process 120 focuses on the perspective of a transmitting coherent optical modem. The process 120 can be implemented in a Digital Signal Processor (DSP), Application Specific Integrated Circuit (ASIC), etc. The process 120 can be implemented in one of the coherent modems 20A, 20B (or both).

The process 120 includes receiving a message to send to a corresponding coherent optical modem (step 122), inserting the message into a subset of a plurality of symbols that are part of a defined Digital Signal Processing (DSP) frame structure for coherent optical communication, wherein the subset of the plurality of symbols is a messaging channel included in the DSP frame structure (step 124), and causing transmission of the plurality of symbols to the corresponding coherent optical modem with the message included in the messaging channel (step 126).

The process 120 can also include receiving a plurality of symbols from the corresponding coherent optical modem, capturing samples of the messaging channel, and determining a message in the messaging channel based on analysis of the samples. The messaging channel can include transmission in a robust manner utilizing any of the message is repeated on any of different polarizations, different DSP frames, and different symbols in a same DSP frame, and use of symbols in the messaging channel for any of parity, Cyclic Redundancy Check (CRC), and Forward Error Correction (FEC). The messaging channel is available prior to the coherent optical modem having a stable bi-directional connection with a corresponding coherent optical modem. The DSP frame can be compliant to G.709.3 Amendment 1 or OIF Implementation Agreement 400ZR or OpenZR+MSA.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A coherent optical modem comprising circuitry configured to:
   receive a plurality of symbols that are part of a defined Digital Signal Processing (DSP) frame structure for coherent optical communication, wherein the DSP frame has a messaging channel included therein that includes a subset of the plurality of symbols,
   capture samples of the messaging channel, and
   determine a message in the messaging channel based on analysis of the samples,
   wherein the determination of the message is performed prior to Forward Error Correction (FEC) decoding on a data path.

2. The coherent optical modem of claim 1, wherein the messaging channel is available prior to the coherent optical modem having a stable bi-directional connection with a corresponding coherent optical modem.

3. The coherent optical modem of claim 1, wherein the DSP frame is compliant to G.709.3 Amendment 1 or OIF Implementation Agreement 400ZR or OpenZR+MSA.

4. The coherent optical modem of claim 1, wherein the message includes any of a message payload, a counter, a version, and an identifier.

5. The coherent optical modem of claim 1, wherein the message includes hardware details.

6. The coherent optical modem of claim 1, wherein the message includes I/Q tributary mapping information.

7. The coherent optical modem of claim 1, wherein the plurality of symbols include any of N-Quadrature Amplitude Modulation (QAM) symbols, where N is an integer, and PCS-QAM with probabilistic constellation shaping, where the PCS has a fractional value, and hybrid N-QAM.

8. A method comprising
   receiving a plurality of symbols that are part of a defined Digital Signal Processing (DSP) frame structure for coherent optical communication, wherein the DSP frame has a messaging channel included therein that includes a subset of the plurality of symbols;
   capturing samples of the messaging channel; and
   determining a message in the messaging channel based on analysis of the samples, wherein the determining is performed prior to Forward Error Correction (FEC) decoding on a data path.

9. The method of claim 8, wherein the messaging channel is available prior to a coherent optical modem having a stable bi-directional connection with a corresponding coherent optical modem.

10. The method of claim 8, wherein the DSP frame is compliant to G.709.3 Amendment 1 or OIF Implementation Agreement 400ZR or OpenZR+MSA.

11. The method of claim 8, wherein the message includes any of a message payload, a counter, a version, and an identifier.

12. The method of claim 8, wherein the message includes hardware details.

13. The method of claim 8, wherein the message includes I/Q tributary mapping information.

14. The method of claim 8, wherein the plurality of symbols include any of N-Quadrature Amplitude Modulation (QAM) symbols, where N is an integer, and PCS-QAM with probabilistic constellation shaping, where the PCS has a fractional value, and hybrid N-QAM.

15. A coherent optical modem comprising circuitry configured to:
  receive a plurality of symbols that are part of a defined Digital Signal Processing (DSP) frame structure for coherent optical communication, wherein the DSP frame has a messaging channel included therein that includes a subset of the plurality of symbols,
  capture samples of the messaging channel,
  determine a message in the messaging channel based on analysis of the samples, and
  transmit, in a corresponding messaging channel, a reply to the message, wherein the reply one or more of
    is repeated on any of different polarizations, different DSP frames, and different symbols in a same DSP frame, and
    uses symbols in the corresponding messaging channel for any of parity, Cyclic Redundancy Check (CRC), and Forward Error Correction (FEC).

16. The coherent optical modem of claim 15, wherein the messaging channel is available prior to the coherent optical modem having a stable bi-directional connection with a corresponding coherent optical modem.

17. The coherent optical modem of claim 15, wherein the DSP frame is compliant to G.709.3 Amendment 1 or OIF Implementation Agreement 400ZR or OpenZR+MSA.

18. The coherent optical modem of claim 15, wherein the message includes any of a message payload, a counter, a version, and an identifier.

19. The coherent optical modem of claim 15, wherein the message includes hardware details.

20. The coherent optical modem of claim 15, wherein the message includes I/Q tributary mapping information.

* * * * *